US009858837B1

(12) United States Patent
Cameron

(10) Patent No.: US 9,858,837 B1
(45) Date of Patent: Jan. 2, 2018

(54) DEPLOYABLE TAPE ESTABLISHING VISIBILITY IN FIELD ENVIRONMENTS

(71) Applicant: Robert W Cameron, Bend, OR (US)

(72) Inventor: Robert W Cameron, Bend, OR (US)

(*) Notice: Subject to any disclaimer, the term of this patent is extended or adjusted under 35 U.S.C. 154(b) by 0 days.

(21) Appl. No.: 14/548,777

(22) Filed: Nov. 20, 2014

Related U.S. Application Data

(60) Provisional application No. 61/907,895, filed on Nov. 22, 2013.

(51) Int. Cl.
*G09F 17/00* (2006.01)
*G02B 5/12* (2006.01)

(52) U.S. Cl.
CPC .............. *G09F 17/00* (2013.01); *G02B 5/12* (2013.01)

(58) Field of Classification Search
CPC .................................. G09F 17/00; G02B 5/12
USPC ...... 116/28 R, 173–175, 209, 200, 222–225; 119/770; D30/153; 441/80; 40/427, 440
See application file for complete search history.

(56) References Cited

U.S. PATENT DOCUMENTS

| 1,872,661 | A | * | 8/1932 | Bramhall, Jr. | .......... G09F 11/23 40/614 |
| 1,915,868 | A | * | 6/1933 | Rogers | ..................... A63F 7/382 446/247 |
| 1,976,093 | A | * | 10/1934 | Raymond | .......... A47G 33/0863 160/332 |
| 2,214,410 | A | * | 9/1940 | Evans | ..................... G09F 13/00 40/431 |
| 2,458,316 | A | * | 1/1949 | Swertlow | .................. G08B 5/02 116/173 |
| 2,869,507 | A | * | 1/1959 | Boyer | ..................... E04H 12/32 116/173 |
| 2,911,746 | A | * | 11/1959 | Frey | .......................... G09F 17/00 40/604 |
| 2,994,300 | A | * | 8/1961 | Grahling | .............. A01K 27/005 119/770 |
| 3,210,990 | A | * | 10/1965 | Cantrell | .................. E02D 1/022 116/200 |
| 3,284,935 | A | * | 11/1966 | Kutschmende | ......... G09F 11/23 40/430 |
| 3,395,577 | A | * | 8/1968 | Keim | ...................... G01P 13/02 116/174 |
| 3,439,446 | A | * | 4/1969 | Alonso | .................... A63F 7/382 446/247 |
| 3,952,694 | A | * | 4/1976 | McDonald | ................. B63C 9/20 114/311 |
| 3,964,189 | A | * | 6/1976 | Belokin, Jr. | ............ G09F 19/02 40/414 |

(Continued)

*Primary Examiner* — Laura Martin
*Assistant Examiner* — Tania Courson
(74) *Attorney, Agent, or Firm* — Roy L Anderson

(57) ABSTRACT

A portable apparatus for forming a visual display, to aid in detection and location by searchers or rescuers, for example. The apparatus includes at least one elongate, flexible strip that produces a visual signal, and at least one support for holding the strip member aloft so that it can be seen at a distance. The strip members are suitably formed of reflective metalized Mylar that can be rolled into a compact form for portability, and produces a vivid reflective pattern. There may also be a single, elongate reflective strip with cords at the end that can be attached to spaced-apart supports, with an elastomeric member being included to maintain tension on the reflective strip. One or more swivels may also be included so as to enable the strip to rotate freely when under tension.

17 Claims, 8 Drawing Sheets

(56) References Cited

U.S. PATENT DOCUMENTS

| | | | | |
|---|---|---|---|---|
| 4,018,189 | A * | 4/1977 | Umphries | A01K 27/004 119/794 |
| 4,055,840 | A * | 10/1977 | Uchytil | B60Q 7/005 116/63 P |
| 4,105,190 | A * | 8/1978 | Curtis | E01F 13/028 116/63 P |
| 4,384,548 | A * | 5/1983 | Cohn | A01K 27/007 119/792 |
| 4,517,758 | A * | 5/1985 | Thompson | G09F 19/02 136/291 |
| 4,541,364 | A * | 9/1985 | Contello | A01K 27/005 119/772 |
| 4,597,351 | A * | 7/1986 | Brainard, II | B63B 35/815 267/74 |
| 4,708,592 | A * | 11/1987 | Krolick | F03D 3/00 290/55 |
| 4,751,896 | A * | 6/1988 | Miley | A47D 13/086 119/770 |
| 4,881,485 | A * | 11/1989 | Feinberg | B60Q 1/482 116/209 |
| 5,167,199 | A * | 12/1992 | Rehbein | G09F 7/22 116/173 |
| 5,168,115 | A * | 12/1992 | Hogrefe | G10G 7/00 84/477 B |
| 5,421,287 | A * | 6/1995 | Yonover | B63C 9/21 116/209 |
| 5,649,504 | A * | 7/1997 | Culp | A01K 27/003 119/795 |
| 5,701,840 | A * | 12/1997 | Cross | G09F 17/00 116/173 |
| 5,718,962 | A * | 2/1998 | Walling | B44C 5/00 428/542.2 |
| 5,901,586 | A * | 5/1999 | Hale | B64F 1/16 70/18 |
| 5,904,116 | A * | 5/1999 | Wyner | G09F 17/00 116/173 |
| 5,975,599 | A * | 11/1999 | Goldstein | B60R 13/04 280/770 |
| 6,079,350 | A * | 6/2000 | Parker | G09F 17/00 116/173 |
| D459,557 | S * | 6/2002 | Rea | D29/106 |
| 6,415,734 | B1 * | 7/2002 | LaPuzza | G01C 11/00 116/201 |
| 6,484,662 | B1 * | 11/2002 | Perucca | B63C 9/20 116/209 |
| 6,675,734 | B2 * | 1/2004 | Eagles | B63B 35/285 114/256 |
| 6,702,328 | B2 * | 3/2004 | Malleis | A63C 11/00 280/14.21 |
| 6,772,711 | B2 * | 8/2004 | Morgan | A01K 27/006 119/795 |
| 6,807,765 | B2 * | 10/2004 | Watermann | A01M 29/06 43/2 |
| 6,807,924 | B1 * | 10/2004 | Christiansen | G09F 17/00 116/174 |
| 6,832,944 | B2 * | 12/2004 | Ostrow | A63H 33/40 40/430 |
| 7,735,445 | B2 * | 6/2010 | Monk | G09F 17/00 116/173 |
| 7,996,963 | B2 * | 8/2011 | Cameron | B60P 7/0823 24/344 |
| 8,257,135 | B2 * | 9/2012 | Arcovio | A63H 37/00 446/242 |
| 8,267,035 | B2 * | 9/2012 | Hamilton | B60Q 7/005 116/28 R |
| 8,832,981 | B2 * | 9/2014 | Desaulniers | B64D 25/20 116/209 |
| 9,326,488 | B2 * | 5/2016 | Zainy | A01K 15/025 |
| 2002/0106481 | A1 * | 8/2002 | Lin | B32B 3/02 428/102 |
| 2003/0145802 | A1 * | 8/2003 | Morgan | A01K 27/006 119/795 |
| 2005/0263061 | A1 * | 12/2005 | Llewellyn | G01P 5/02 116/174 |
| 2007/0283875 | A1 * | 12/2007 | Durkin | G09F 17/00 116/173 |
| 2009/0139441 | A1 * | 6/2009 | Barone | G09F 17/00 116/173 |
| 2009/0288590 | A1 * | 11/2009 | Pasquini | A63C 11/003 116/209 |
| 2011/0203533 | A1 * | 8/2011 | Hurwitz | A01K 27/004 119/794 |

* cited by examiner

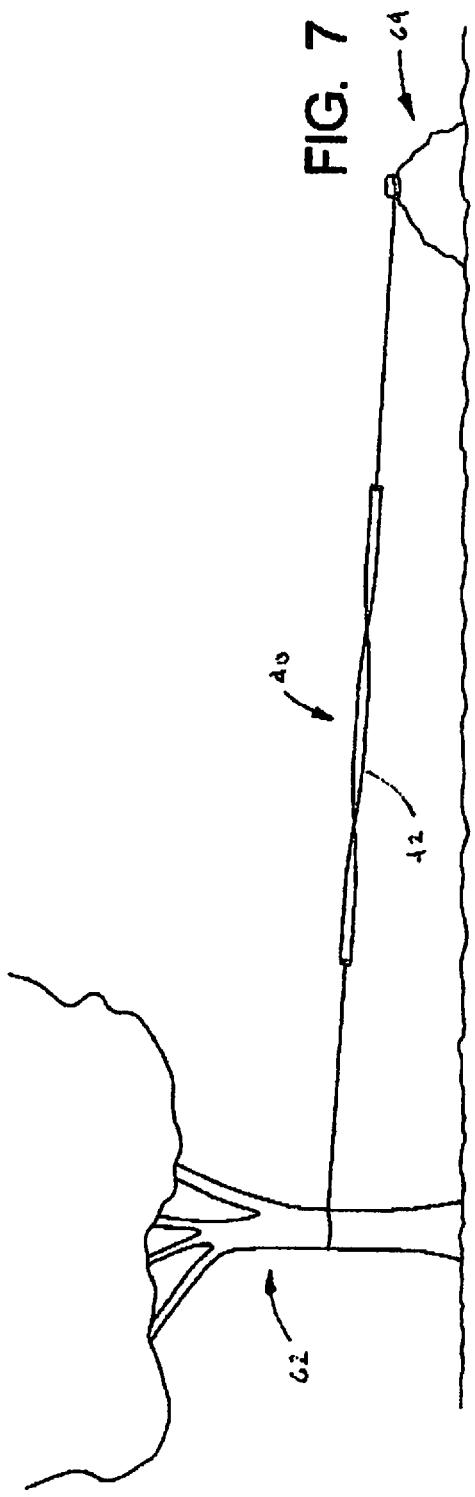
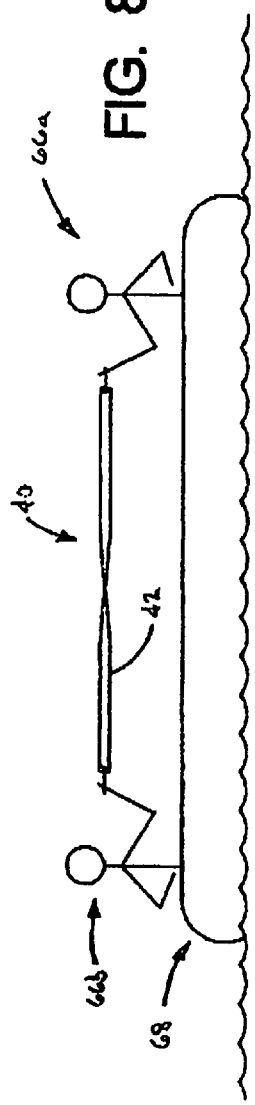

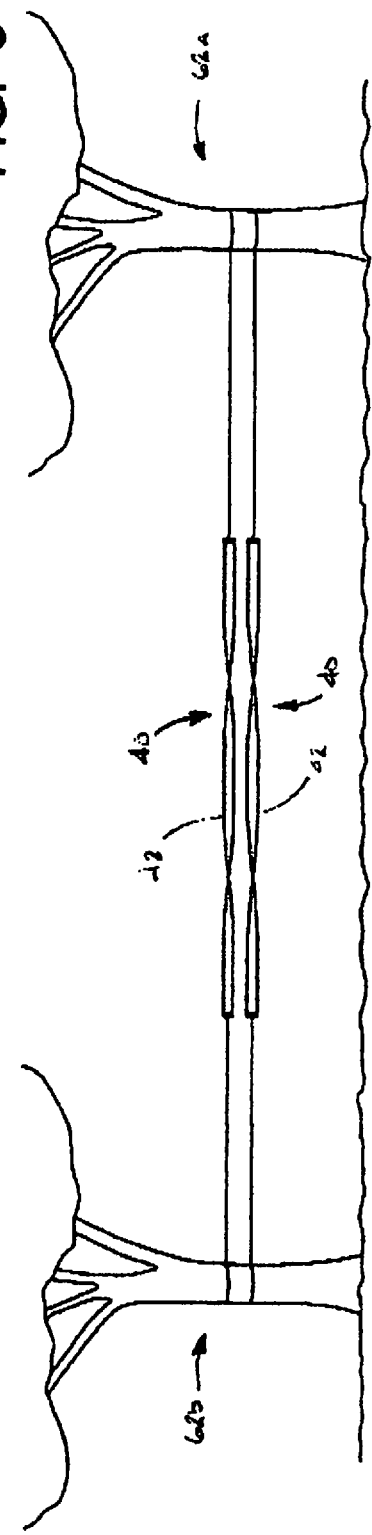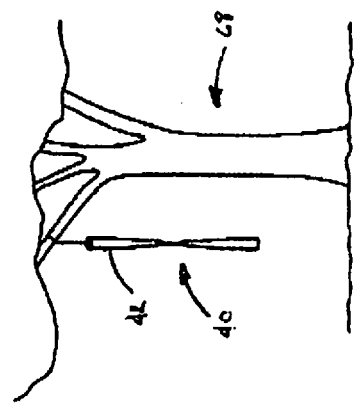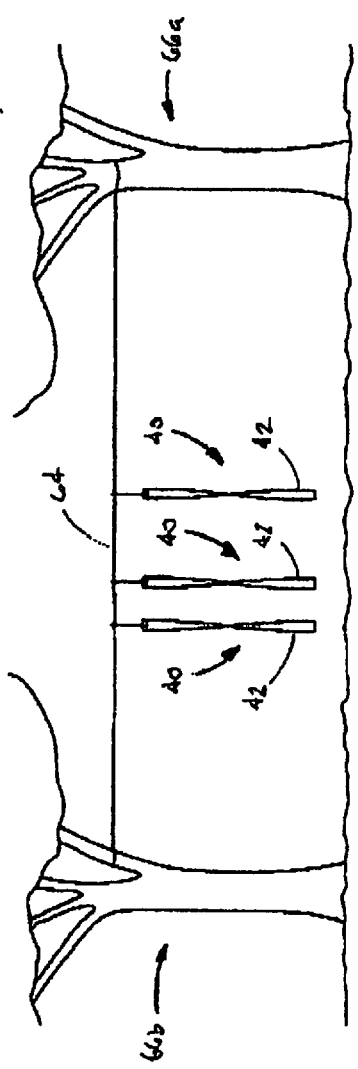

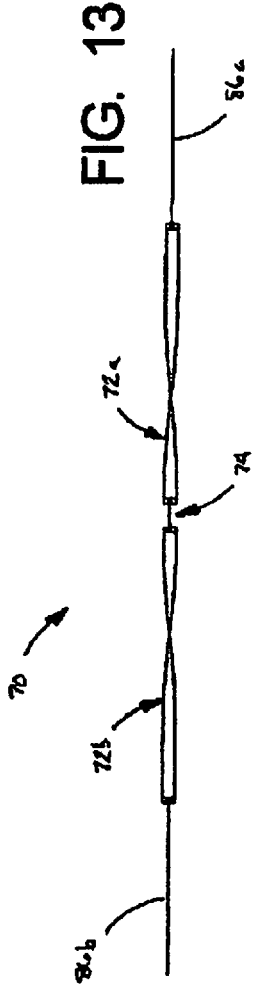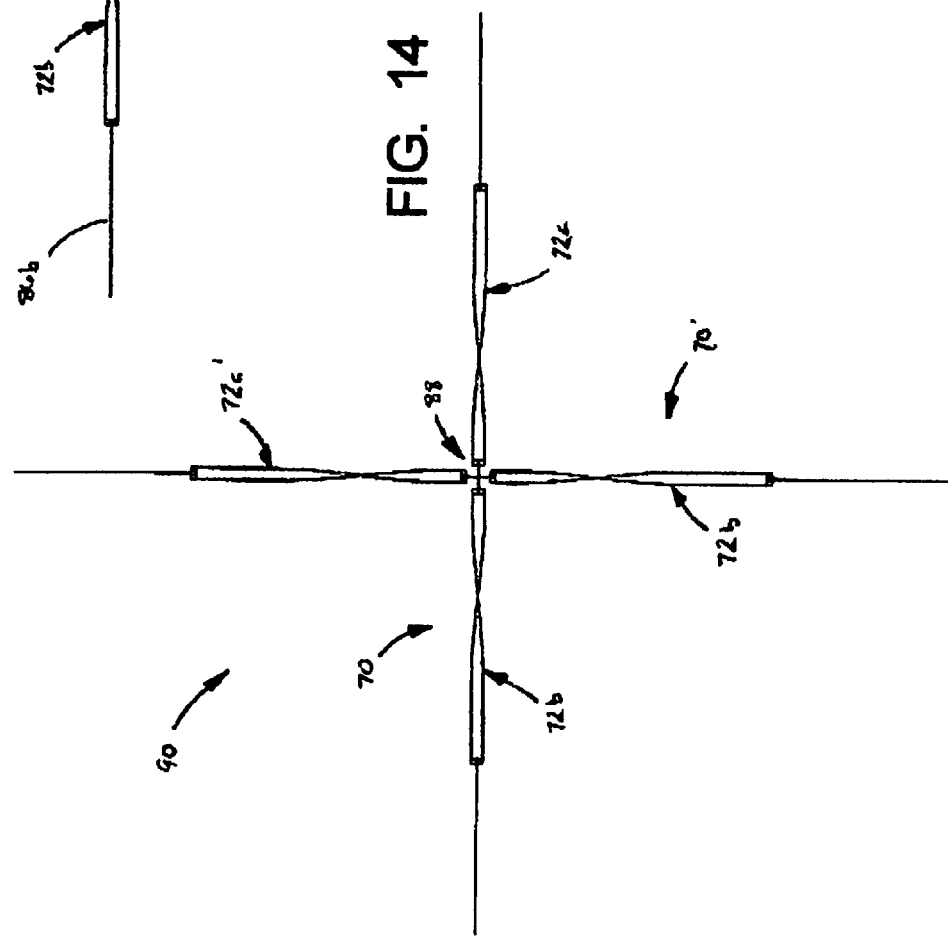

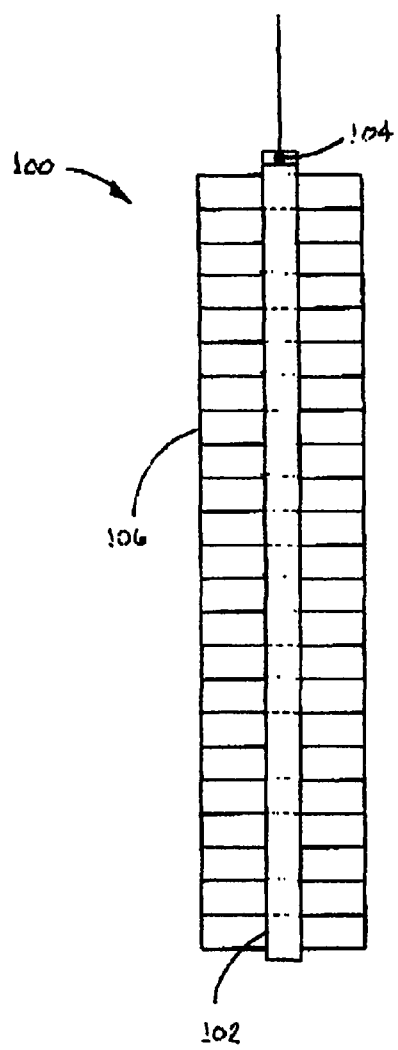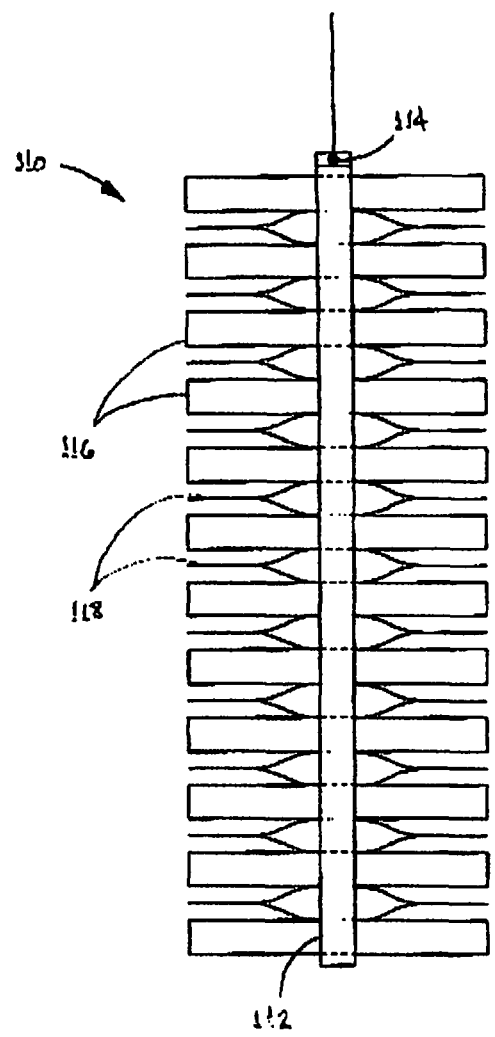

DEPLOYABLE TAPE ESTABLISHING VISIBILITY IN FIELD ENVIRONMENTS

CROSS REFERENCE TO RELATED APPLICATIONS

This application is a non-provisional that claims priority from U.S. Ser. No. 61/907,895, filed Nov. 22, 2013, the disclosure of which is specifically incorporated herein by reference in its entirety.

FIELD OF THE INVENTION

The present invention relates generally to devices used to establish visual contact at a distance and, more particularly, to an apparatus that employs a high visibility material that can be stored in a compact form for carrying-purposes and deployed to form an elongated visual display when needed.

BACKGROUND OF THE INVENTION

There are many cases where it is imperative to establish one-way visual contact in a field environment, in both emergency and-operational situations.

For example, it is known that individuals who are lost or stranded in unpopulated locations have need to increase their visibility to searchers especially to those who may be attempting to locate them. Aircraft are commonly used for search and rescue (SAR) operations, due to their obvious ability to view large areas from an altitude. However, it is also well known that the very distance and expanse of the view renders it difficult for personnel to spot an individual from an aircraft, the problem akin to finding a needle in a haystack. Consequently, a number of approaches have been adopted over the years to increase the visibility of an individual (or group of individuals) to searching aircraft, with varying degrees of success and also varying disadvantages.

One of the most basic is the use of a small mirror to reflect sunlight towards the aircraft. This approach is highly effective under optimal circumstances, such as when signaling an aircraft from a raft in the ocean under clear skies and bright sunlight. It is much less effective; however, under cloudy or rainy conditions or in wooded areas. Furthermore, it requires the vigilance and active participation of the individual, who may be sleeping or otherwise unaware as the aircraft passes over, and who may also be suffering from the effects of exhaustion, exposure and/or injuries that would impair the individual's alertness and ability to use the mirror. Moreover, a degree of skill is required to angle the mirror so as to direct the reflected sunlight towards the aircraft, which is all the more difficult when the aircraft can be glimpsed only briefly between trees or other cover. Yet another drawback of signaling mirrors is that they must be quite small (only a couple of inches on a side) in order to be sufficiently compact to be carried, which necessarily limits the size of the reflective surface that can be presented towards the observer.

Other "active" signals have also been used for many years, including various types of flairs and smokes. However, these signals have a very limited duration (front several seconds to a few minutes) and once expended can no longer be used. Moreover, their bulk and weight renders it impractical for an individual to carry more than one or two at most. Hence, their use has generally been limited to boats, rafts and other vessels/vehicles having a substantial carrying capacity.

Various passive signals and visibility enhancements have also been adopted, i.e. signal enhancements that do not require active operation by the individual or individuals being sought. Examples include arranging blocks or logs in a large "X" in a clearing. Although helpful, the use of natural materials (presenting a low contrast against their surroundings) and the steady nature of such displays mean that they are nevertheless hard to spot. Moreover, any significant fatigue or injury to the individual would render it difficult to mange such objects in an adequately large display.

The further disadvantage of most prior approaches is that (with the exception of flairs and the like) they cannot be seen at night. Radar equipped search aircraft are available, however, the conventional approaches generally present either inadequate radar cross-sections or returns that are indistinguishable from their surroundings. Infrared (IR) search equipment is also available for night use; however, the IR signature of a person is virtually indistinguishable from that of a deer or many other large animals.

Yet another factor is that under some circumstances, particularly military operations, it is critical that the signal be visible only to "friendly" observers and not others. For example, it is preferable that the position of a pilot downed in hostile territory be visible only to allied recovery personnel and not to enemy forces. In other instances, advance or Special Forces personnel may wish to indicate a certain site, such as a beach approach or drop area, with a marker that is visible only for those for whom the signal was intended.

Accordingly, there exists a need for an apparatus that enables an individual to establish a visual display that can be effectively seen by observers under a wide range of conditions. Furthermore, there exists a need for an apparatus that is easily deployed by an individual even if fatigued or injured, and that does not require active intervention by the individual once deployed. Still further, there is a need for such an apparatus that can be used effectively during both night and day. Still further, there exists a need for such an apparatus that produces official display that can be seen at long distance. Still further, there exists a need for such an apparatus that is compact and lightweight so as to be highly portable by an individual. Still further, there exists a need for such an apparatus that can be arranged in various ways to provide a variety of signals to the observer or observers. Still further, there exists a need for such an apparatus that can be configured to produce a display that is visible only to desired observers and not to others.

SUMMARY OF THE INVENTION

The present invention has solved the problems cited above, and is a portable apparatus forming a visual display. Broadly, the apparatus comprises: at least one elongate, flexible strip member for producing a visible signal, and at least one support member for holding the strip member aloft so that the signal is visible at a distance therefrom.

The at least one strip member may be formed of a light-reflective material, such as metalized Mylar film. The Mylar film may comprise first and second reflective sides having contrasting colors.

The at least one strip member may comprise a plurality of strip members joined together at a first end and free at second end, and means for attaching the first end of the strip members to the support member. The support member may comprise a telescoping wand member. The means for attaching the end of the strip members to the support member may comprise a grommet that is mounted at the first end of the strip members for receiving a tip portion of the wand member in engagement therewith. The tip portion of the wand member may comprise a tip member formed of a resiliently yielding material and having a diameter slightly larger than that of the grommet, so that the tip member forms an interference engagement with the grommet when pressed therethrough.

In another embodiment, the at least one strip member has first and second ends and first support members attached to the ends of the strip member. The first and second support members may comprise first and second elongate cord members for connecting the ends of the strip member to spaced-apart supports.

The apparatus may further comprise at least one elastomeric member that interconnects one of the cord members to an end of the strip member so as to maintain tension on the strip member when drawn taut between two spaced-apart supports. The at least one elastomeric member may comprise first and second elastomeric members at the first and second ends of the elongate strip member.

The apparatus may further comprise at least one swivel interconnecting one of the cord members and an end of the strip member so that the strip member is able to rotate freely when tensioned between spaced-apart supports.

The apparatus may further comprise a reinforcing strip that extends longitudinally over the strip member between its first and second ends so as to relieve tension on the light reflective material of the strip member when tensioned between spaced-apart supports.

The elongate strip member may comprise first and second elongate strip portions, and a connector member that interconnects adjoining ends of the first and second trip portions, and that is joinable to the connector member of a second strip member, so that the strip members can be joined together and displayed in an X-shaped distress pattern. The connector member may comprise an elongate portion that can be intertwined with the elongate flexible portion of a connector member of the second strip member, and swivel members joining the connector member to the adjoining ends of the first and second strip portions, so that the strip portions are free to rotate when the connector members are intertwined. The elongate flexible portion of the connector member may comprise a length of swivel-ball chain.

These and other features and advantages of the present invention will be more fully understood from a reading of the following detailed description with reference to the accompanying drawings.

BRIEF DESCRIPTION OF THE DRAWINGS

FIGS. 7-10 are elevational environmental views showing various manners in which the display apparatus of FIGS. 5-6 can be deployed, namely, by attachment of a single strip between a tree and rock or other stationary object, by tensioning the strip between two individuals in a raft, by having a plurality of strips on a ropes between two trees or other stationary objects, and suspending the strips from the branches of a tree or similar object.

FIG. 11 is an elevational environmental view showing how multiple strips may be hung from a suspended strip.

FIG. 13 is an elevational view of the articulated display assembly of FIG. 12, showing the configuration of the assembly when deployed.

FIG. 14 is an elevational view, similar to FIG. 13, showing two of the articulated display assemblies arranged in a cross pattern to form a recognized distress signal.

FIG. 15 is a partial, elevational view of a reflective member in accordance with another embodiment of the present invention, in which the reflective member includes a main, longitudinally extending strip for bearing tension loads and a multiplicity of short, laterally extending reflective strips for increasing the reflective area of the member.

FIG. 16 is a partial elevational view of a reflective member of another embodiment of the present invention, similar to FIG. 15, in which each transversely extending strip is twisted 90 degrees, so as to increase the angles from which the reflection of the member may be visible to an observer.

DETAILED DESCRIPTION

Figure 1:
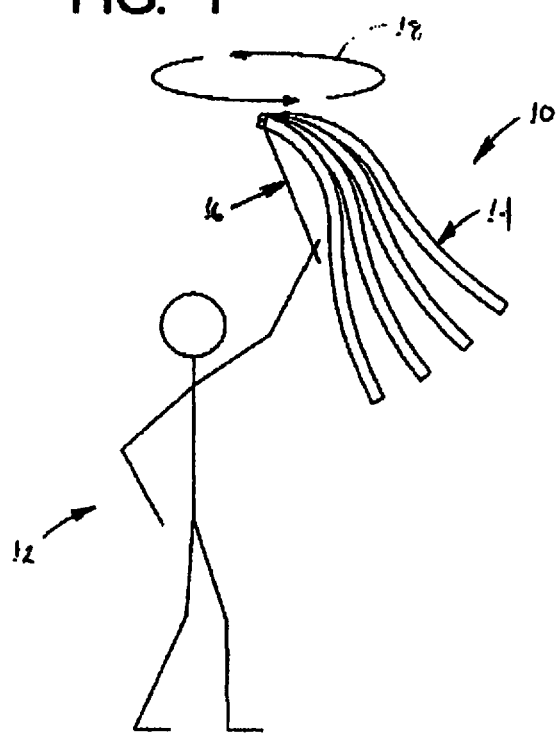
FIG. 1 is a perspective, environmental view showing an operator creating a distress display using the apparatus in accordance with the present invention.

FIG. 1 shows a display apparatus 10 in accordance with the present invention held aloft by an individual 12. As can be seen, the display apparatus includes a multi strip reflector member 14 and a wand member 16. The wand member provides a handle by which the individual can elevate and swing or otherwise move the reflector member as indicated by arrows 18, so as to cause the strips of the reflector member to flutter and produce a reflection having a "flashing" effect; the apparatus can thus be used in an "active" fashion by the individual, however, it can also function on its own once deployed, as will be described below.

Figure 2:
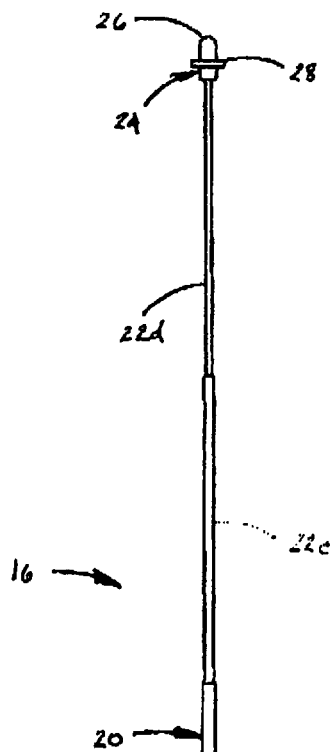
FIG. 2 is an elevational view of the rod member of the signaling apparatus of FIG. 1, showing the rod member in its extended configuration.
Figure 3:
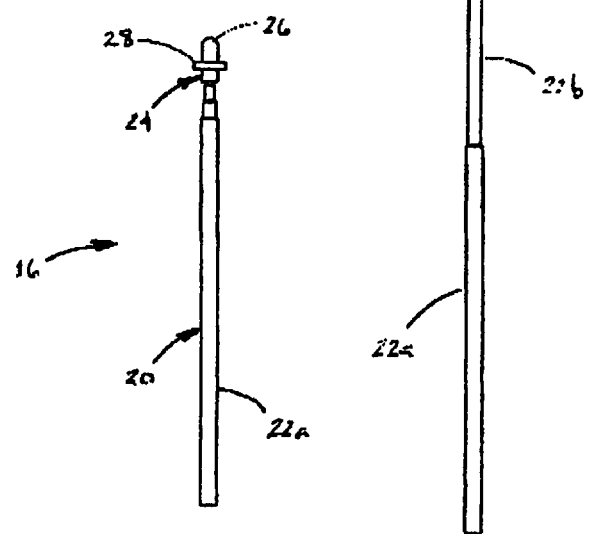
FIG. 3 is a second elevational view of the rod member of FIG. 2, showing the rod member in its retracted configuration.

As can be seen in FIGS. 2-3, the wand member 16 includes a collapsible rod 20 having a plurality of telescoping segments 22a-d. In the embodiment that is illustrated, each of the segments simply has a length of about 6 inches, allowing the assembly to collapse from an extended position of about 2 feet, as shown in FIG. 2, to a length of about 6 inches for ease of carrying, as shown in FIG. 3; it will be understood, however, that greater/fewer segments and greater/lesser lengths may also be used.

A cap member 24 is mounted at the distal end of the upper most end of the segment 22d of the rod. As can be seen, the cap member includes a projection tip 26 having a domed end and generally cylindrical exterior bounded by an annular flange 28. As will be described in greater detail below, the tip member 24 provides an attachment fitting for the reflector member 14, and is suitably formed of a rigid, somewhat resiliently flexible material such as molded plastic or rubber, for example.

Figure 4:
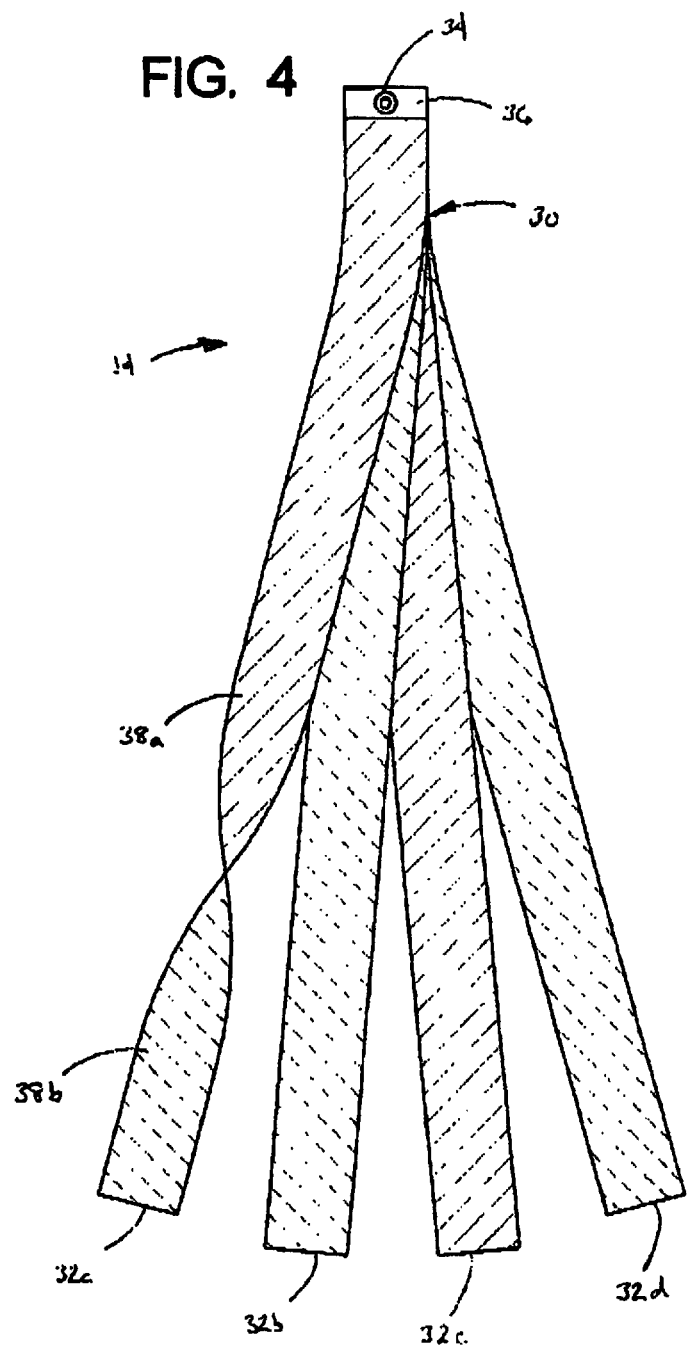
FIG. 4 is an elevational view of the multi-strip reflective member of the signaling apparatus of FIG. 1, showing the manner in which the opposite sides of the individual strips thereof have reflective characteristics.

As can be seen in FIG. 4, the reflector member 14 includes a bundle 30 of strips 32a-d formed of thin, flexible reflective material. At one end the strips are free and at the other they are bound together by a grommet 34 that passes through the strips in an overlying layer of reinforcing menial 36. The strips 32a-d are suitably formed of metalized Mylar, preferably with contrasting, high visibility colors (e.g., red and silver) on the two sides 38a, 38b. Furthermore, as will be described in greater detail below, additional light and radar reflective materials may be included in the strips, as well as self-luminescent materials. The strips preferably have a length of about 4 feet, so as to have sufficient length to be visible from a distance but short enough to be held aloft and waved by an individual of average height.

The metalized Mylar strips are preferably attached to one another in such fashion so that the entire reflective member 14 can be rolled into a very compact, portable package. Similarly, the wand member 16 contracts to a very small lightweight package.

When needed, the wand and reflector members are extracted from a suitable carrying pouch or the like and the strips of the reflector member unrolled. The plastic tip member 24, with the resilient material of the tip member yielding slightly as this is done, creates a firm interference engagement between the wand and reflector members. The rod 20 of the wand member is then extended telescopically to its full length, so that the assembly can be held aloft and waved as is shown in FIG. 1. As this is done, the reflections, from the fluttering metalized Mylar strips, create a brilliant flickering or flashing effect that is visible at long distances, even under relatively hazy conditions. Moreover, the metalized Mylar provides a radar return that aids detection by radar equipped search aircraft or vessels.

In addition to being waved actively by the user, signaling assembly 10 may be secured to a tree, post, rock or the like to provide a signal which the person is passive, e.g., resting or asleep, particularly if there is sufficient breeze to cause motion of the strips and therefore create the "flashing" visual pattern.

FIGS. 5-10 illustrate an embodiment of the invention in which there is a single elongate reflective strip rather than a plurality of strips joined together at one-end as shown in FIGS. 1-4. The increased length of the single strip is such that it cannot be easily held aloft and waved by an individual in a manner previously described, however, the assembly provides additional advantages that will be described below.

Figure 6:
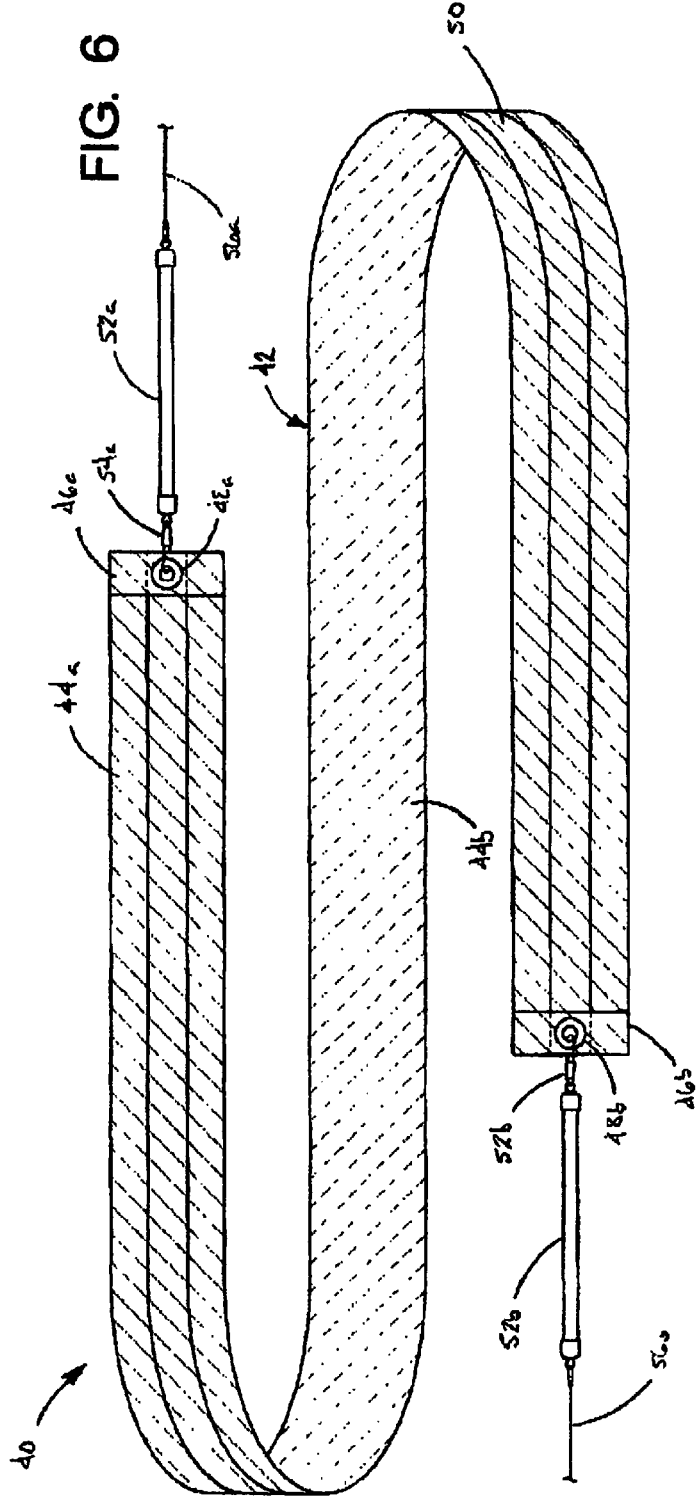
FIG. 6 is an enlarged elevational view of the display apparatus of FIG. 5, showing the configuration of the strip and resilient members thereof in greater detail.

As can be seen, the signaling assembly 40 as shown in FIG. 6 includes a single, elongate reflective strip member 42. Similar to the embodiment described above, this is suitably formed of metalized Mylar, with contrasting colors (e.g., red and silver) on its opposite sides 44a, 44b. However, the length of the strip is much greater, with a length of 8 feet being eminently suitable. Similar to the embodiment described above, the enforcing strips 46a, 46b are folded over the ends of Mylar strip member 42, and that provides support for grommets 48a, 48b that form attachment openings. In addition, a longitudinal reinforcement strip 50 runs the length of the Mylar strip and is attached to the grommets and reinforcement strips at the ends, so as to reinforce the Mylar against longitudinal loads. The reinforcement strips 46a, 46b, and 50 are suitable formed of fiberglass tape having a color (e.g., red) that matches that of the side of the Mylar strip to which it is mounted. The fiberglass tape is mounted to the Mylar by adhesion or other suitable means.

First and second elastomeric cords 52a, 52b are mounted to the ends of the elongate reflective strip 42 by swivel members 54a, 54b that attach to the grommets 48a, 48b. The elastomeric members are suitably formed of short lengths of stretchable ("bungee") cord, surgical tubing, with conventional connectors at the ends, or the like, while the swivel members may suitably be, for example, conventional metal swivels of the type commonly employed-in fishing gear.

Figure 5:
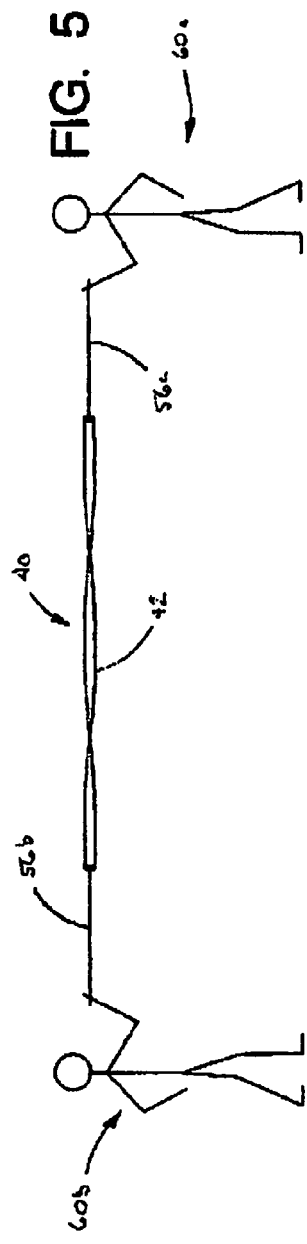
FIG. 5 is an elevational, environmental view of an apparatus in accordance with a second embodiment of the present invention, showing the manner in which this is extended to provide an elongate visual display.

Cords 56a, 56b are attached to the opposite ends of the elastomeric members 52a, 52b, i.e., the ends opposite the swivels/grommets. The lines may simply be formed of lightweight cordage, such as parachute cord, for example, and allow the reflective strip member 42 to be stretched taut between two objects. For example, the cords may be held by two persons 60a, 60b and stretched taut as shown in FIG. 5. Similarly, the reflective assembly 40 may be stretched between two fixed objects, such as a tree and rock 62, 64 as shown in FIG. 7, or between two persons 66a, 66b in a raft 68, as shown in FIG. 8. These are, of course, only a few examples of the many ways the ends of the cords can be attached to spaced-apart objects.

With the assembly 40 held taut in an exposed location, as shown in FIGS. 5 and 7-8, even slight air movement will cause the reflective strip member 42 to rotate and twist between the two elastomeric members 52a, 52b, by virtue of the broad, flat surfaces of the strip that are exposed to the wind; in even a moderate breeze, the twisting and turning action becomes very rapid and pronounced. As a result, the reflected light produces a rapidly flashing almost strobe like effect that quickly catches the eye, even at comparatively long distances.

The elastomeric members (52a, 52b) allow the assembly to be drawn taut without overtensioning the reflective strip 42, both avoiding damage to the strip and allowing it to turn/twist freely as described above. It will be understood that some embodiments may include only a single elastomeric member, rather than the two that are shown in FIG. 6. Moreover, in some embodiments a swivel may be provided at only one end of the strip the elastomeric member maybe fixed directly to the opposite end, so that the strip tends to "wind up" (in a manner similar to a rubber band powered airplane) while the wind is blowing and then unwinds when it slackens, so that the reflective strip member twists and turns more or less constantly under gusty or intermittent wind conditions.

FIGS. 9-11 illustrate other ways in which the signaling apparatus 40 can be mounted and displayed in a field environment. FIG. 9 shows the manner in which a plurality of devices may tensioned between two trees 62a, 62b or other objects, with the reflective strip members 42 running closely parallel to one another; this bas the effect of combining the visual display of the reflective strips so that they are even more easily spotted. Similarly, FIG. 11 shows the manner in which a plurality of devices can again be mounted with the strips 42: running parallel and adjacent to one another, in this instance by suspending the from a rope 64 or other line that is strung between two trees 66a, 66b or other objects. FIG. 10, in turn, shows an arrangement in which the attachment cord at one end can simply be tied to a limb of a tree 68 so that the strip 42 is suspended therefrom. A great many other arrangements are, of course, possible; it will be understood however, that in general those arrangements in which strips are held in a tensioned relationship between two objects will provide a more consistent display that is less likely to become disarranged and tangled than those instances where the strips are merely suspended.

Figure 12:
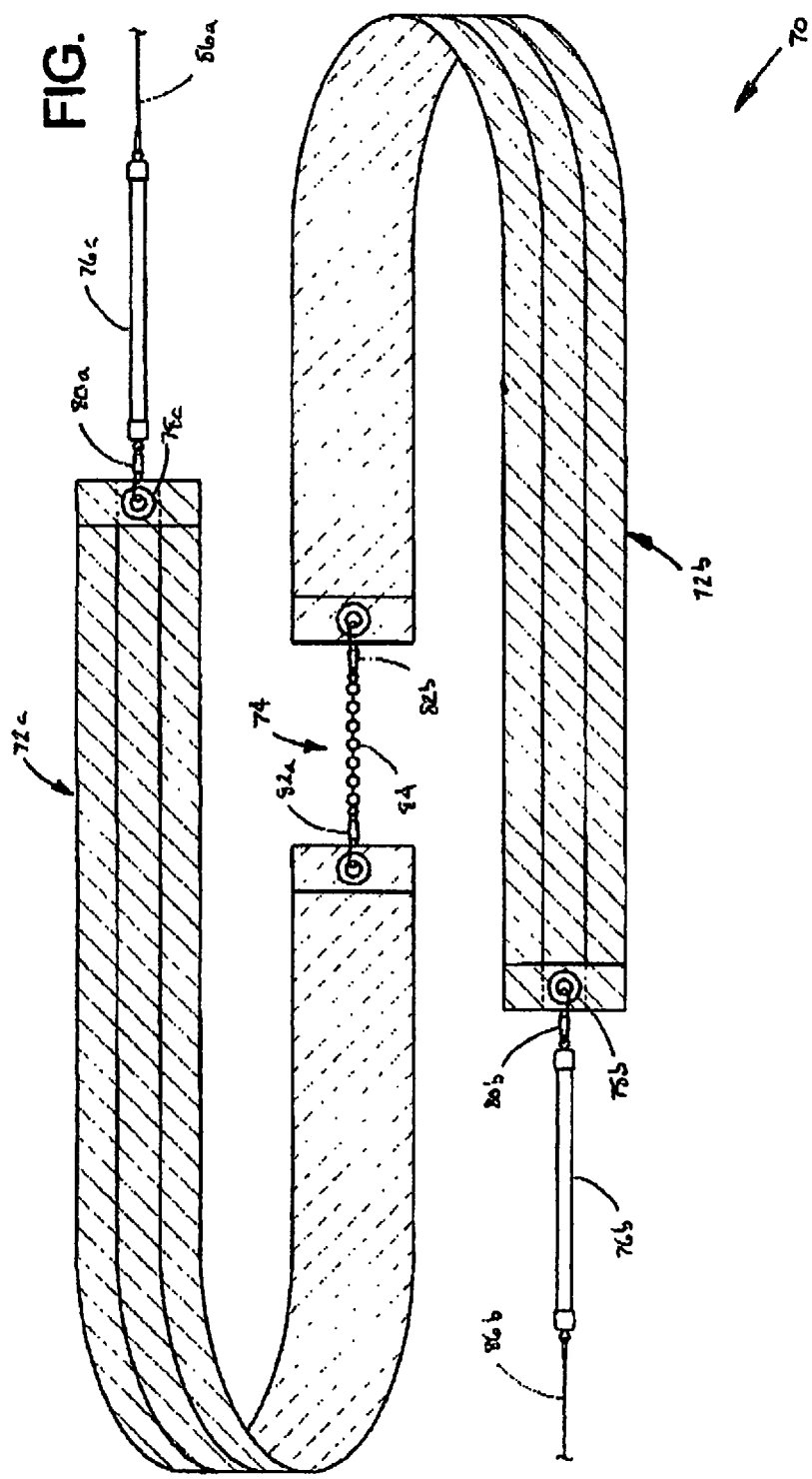
FIG. 12 is an elevational view, similar to FIG. 6, showing the manner in which two of the strip members may be connected end-to-end by a swivel member, so as to form an articulated display assembly in which the strip members are individually rotatable.

FIG. 12 shows an apparatus 70 in accordance with another embodiment of the invention, in which the reflective portion is made up of two strip members 72a, 72b that are joined end-to-end by a connector member 74. The strip members are substantially identical in construction to the strip member 42 described above, although they may be somewhat shorter (e.g., about 4 feet in length). Similarly, the elastomeric members 76a, 76b are attached to grommets 78a, 78b, at the distal ends of the strips by swivels 80a, 80b in the same manner as described above. The central pivot connection 74, in turn, is suitably formed of swivels 82a, 82b interconnected by a short length of ball swivel chain 84. Accordingly, the two strip members 72a, 72b which are preferably of approximately equal length, are free to rotate independently of one another even though they are commonly tensioned between the two sets of elastomeric members 76a, 76b and attachment cords 86a, 86b.

Accordingly, as can be seen in FIG. 13, a single device 70 can be tensioned between two objects or otherwise displayed in a straight line, in essentially the same manner as described above, but with each of the strip members 72a, 72b twisting/rotating independently. Furthermore, as can be seen in FIG. 14, two of the assemblies 70, 70' can be arranged at right angles to one another with the connector chains 74 twisted together, to form an "X" Pattern, that is (as noted above) an established distress signal; in this configuration, each of the reflective strip member 72a, 72b and 72a', 72b' will continue to-rotate freely, even though the two assemblies are interconnected at the middle.

FIGS. 15-16 show additional configurations of the reflective strip members that may be used in the apparatus described above. Each is subdivided into a series of extending strip portions provide a larger and more active visual signal, albeit at the cost of being somewhat less compact when in rolled up form.

As can be seen, the reflective strip member 100 that is shown in FIG. 15 includes the longitudinally extending reinforcement strip 102 having grommets 104 that form attachments eyes at its end (one end only being shown. in FIG. 15), similar to the reinforcement strip described above with reference to FIG. 6. The reflective, metalized Mylar material, in turn, is formed into a plurality of transversely extending strips 106 that are mounted to the reinforcing strip 102, so that the strips extend on both sides thereof in substantially edge-to-edge relationship. The distal ends of the strips 106 are therefore free to move and "flutter independently of one another while the tension is borne by the reinforcing strip 102. The added width and independent movement created by the transversely extending strips tends to produce a reflective pattern that is more active and visible at different angles under certain conditions.

The reflective member 110 that is shown in FIG. 16 is generally similar to that of FIG. 15, in having a plurality of transversely extending strips that are mounted to a longitudinally extending reinforcing strips 112 having grommets 114 that form attachment eyes at the ends. In this instance, however, they alternative between flat strip portions 116 that lie in the main plane of the reflective member; as defined by the reinforcing strip 112, and twisted strip members 118 having distal ends that are permanently turned to extend generally perpendicular to the main plane. As with the reflective member described in FIG. 15, all of the strip portions 116, 118 are five to flex and flutter in wind with the twisted portions 118 providing an additional reflected pattern that is more visible from directions in line with the reflective member i.e., when looking at it along its length rather than from the side.

As was noted above, the preferred metalized Mylar material that forms the reflective strips provides a radar return that can be detected by radar equipped search craft. To further enhance the radar signature, additional materials may be adhered to or embedded in the strips, such as bits of aluminum foil, for example.

Furthermore, as was also noted above, under certain circumstances, notably military operations, it is desirable that the visual pattern be visible only to friendly forces and not to others, or at least not to the naked eye. This can be achieved with the present invention by, for example, forming the strip member with an infrared luminescent capability, or with a self-heating capability, so that the signal is only visible to personnel having IR detection gear. The strips may also be configured to only be visible in the IR rather than visible light range.

It is to be recognized that various alterations, modifications, and/or additions may be introduced into the constructions and arrangements of parts described above without departing from the spirit or ambit of the present invention as defined by the appended claims.

For example, building upon the above description, strips of metalized Mylar material can be adopted for use on small watercraft, such as kayaks, or boats. The strips might be secured to a side of a watercraft, or suspended from a pole extending in a vertical position for use with the strips. Also, the strips might be fitted with floats, to insure that the strips remain on the surface of the body of water in which the watercraft is located, thus providing an effective signaling device. Moreover, such use can be used to create a radar signature for the watercraft, which is especially important for kayaks and the like in low visibility situations where larger vessels might overrun the smaller, less visible watercraft.

Another example of how the teachings of the present invention can be incorporated into other constructions involves devices that activate during sudden physical contact, such as a plane crash or a vehicle driving off the side of a road down into a canyon. In such scenarios a compact device can be fitted to the aircraft or vehicle, or several such devices can be used, which are triggered by sudden impact. Thus, for example, the device can have a spring-loaded or explosive device (e.g., carbon dioxide cartridge) that shoots strips of metalized Mylar material into the air upon impact. The strips can also include weights, such as three pronged fish hooks or the like, to help catch the strips in vegetation after the device is activated. In this particular embodiment, the emergency activation upon impact will create a signal that can be seen by radar, so it will be easier to locate the downed plane or vehicle.

Accordingly, it will be readily apparent to those skilled in the art, armed with the present disclosure, that many additional applications and modifications may be made to the present disclosure. Also, it is also readily apparent that the present disclosure advances unique methods and devices for creating radar signatures in situations where the person or persons creating the radar signatures want to be located. In this regard, while the present disclosure has focused on using strips of materials, because they are compact, inexpensive and easy to deploy, they key to creating the radar signature is creating large numbers of sharp edges to reflect the radar, and the teachings described herein can be used to create thousands of such sharp edges with relative ease.

What is claimed:
1. A portable signaling assembly comprising:
   a composite strip with a broad and flat profile, said composite strip comprising:

an elongate reflective strip formed of a metalized film having a first planar surface and a second planar surface opposed the first planar surface;

an elongate reinforcing strip longitudinally affixed to said strip of metalized film with a first end configured with a first centered attachment mechanism and a second end configured with a second centered attachment mechanism;

first and second elongate attachment cords connected to the first and second centered attachment mechanisms for selective retention by spaced-apart supports, wherein at least one of the first and second elongate attachment cords are stretchable; and at least one swivel member interconnecting an attachment cord to either the first or the second centered attachment mechanism;

wherein the composite strip is only held between the first and second centered attachment mechanisms so that the composite strip is free to rotate and twist between said first and second centered attachment mechanisms; and wherein the portable signaling assembly is configured so that when it is retained by the spaced-apart supports and the composite strip is held taut in air due to stretching of at least one of the first and second elongate attachment cords the composite strip freely twists and rotates along a line formed between the first and second centered attachment mechanisms when a breeze contacts the broad and flat profile to create a visual signaling display as a result of twisting and rotation of the elongated reflective strip in which the elongated reflected strip is twisted at least once through one hundred and eighty degrees so that the first planar surface and the second planar surface are visible from a single vantage point.

2. The portable signaling assembly of claim 1 wherein the first planar surface has a first color and the second planar surface has a second color, and the first color and the second color are contrasting colors.

3. The portable signaling assembly of claim 2 wherein the first color is silver and the second color is red.

4. The portable signaling assembly of claim 1 wherein the first and the second centered attachment mechanisms are comprised of a grommet.

5. The portable signaling assembly of claim 1 wherein the composite strip has a length of at least approximately 8 feet.

6. The portable signaling assembly of claim 1 wherein the elongate reinforcing strip is comprised of a fiberglass tape.

7. The portable signaling assembly of claim 1 wherein the composite strip is further comprised of:

a second elongate reflective strip formed of the metalized film; and a second elongate reinforcing strip longitudinally affixed to said second strip of metalized film;

wherein the elongate reinforcing strip and the second elongate reinforcing strip are joined end-to-end by a connector member.

8. The portable signaling assembly of claim 7 wherein the connector member is a swivel connector and the elongate reinforcing strip and the second elongate reinforcing strip are free to rotate independently of one another.

9. The portable signaling assembly of claim 1 wherein the elongate reflective strip is comprised of a plurality of transversely extending strips that are affixed to the elongate reinforcing strip so that the plurality of transversely extending strips extend on both sides of the elongate reinforcing strip in a substantially edge-to-edge relationship.

10. The portable signaling assembly of claim 9 wherein the plurality of transversely extending strips is comprised of a first set of strips having distal ends that are permanently turned to extend generally perpendicular to a main plane in which the elongate reinforcing strip is located and a second set of strips having distal ends that extend in the main plane.

11. A method for providing emergency signaling from a portable signaling assembly, comprising the steps of:

(1) retaining a first end of the portable signaling assembly at a first location, wherein the portable signaling assembly is comprised of:

a composite strip with a broad and flat profile, said composite strip comprising an elongate reflective strip formed of a metalized film having a first planar surface and a second planar surface opposed the first planar surface and an elongate reinforcing strip longitudinally affixed to said strip of metalized film with a first end configured with a first centered attachment mechanism and a second end configured with a second centered attachment mechanism, first and second elongate attachment cords connected to the first and second centered attachment mechanisms for selective retention by spaced-apart supports, wherein at least one of the first and second elongate attachment cords are stretchable, and at least one swivel member interconnecting an attachment cord to either the first or the second centered attachment mechanism;

wherein the composite strip is only held between the first and second centered attachment mechanisms so that the composite strip is free to rotate and twist between said first and second centered attachment mechanisms; and (2) retaining a second end of the portable signaling assembly at a second location so that the composite strip is held taut in air due to stretching of at least one of the first and second elongate attachment cords and the composite strip freely twists and rotates along a line formed between the first and second centered attachment mechanisms when a breeze contacts the broad and flat profile of the composite strip to create a visual signaling display as a result of twisting and rotation of the elongated reflective strip in which the elongated reflected strip is twisted at least once through one hundred and eighty degrees so that the first planar surface and the second planar surface are visible from a single vantage point.

12. The method of claim 11, wherein the first elongate attachment cord is retained at the first location by securing it to a fixed physical object.

13. The method of claim 12, wherein the second elongate attachment cord is retained at the second location by securing it to a second physical object.

14. The method of claim 12, wherein the second elongate attachment cord is retained at the second location by having a person hold it at the second location.

15. The method of claim 12, wherein the first elongate attachment cord is retained at the first location by having a first person hold it at the first location and the second elongate attachment cord is retained at the second location by having a second person hold it at the second location.

16. A method for detection of an emergency signal, comprising searching for a visual signaling display created by an elongate reflective strip formed of a metalized film having a first planar surface and a second planar surface opposed the first planar surface, wherein the visual signaling display is created when the elongate reflective strip is held taut in air and the composite strip freely twists and rotates along a horizontal line formed in the elongate reflective strip which is twisted at least once through one hundred and eighty degrees so that the first planar surface and the second planar surface are visible from a single vantage point.

17. The method of claim 16, wherein radar is used to search for the visual signaling display.

\* \* \* \* \*